Feb. 24, 1959 R. W. COURSEY 2,874,822
STORAGE SYSTEM
Filed Jan. 31, 1957 11 Sheets-Sheet 1
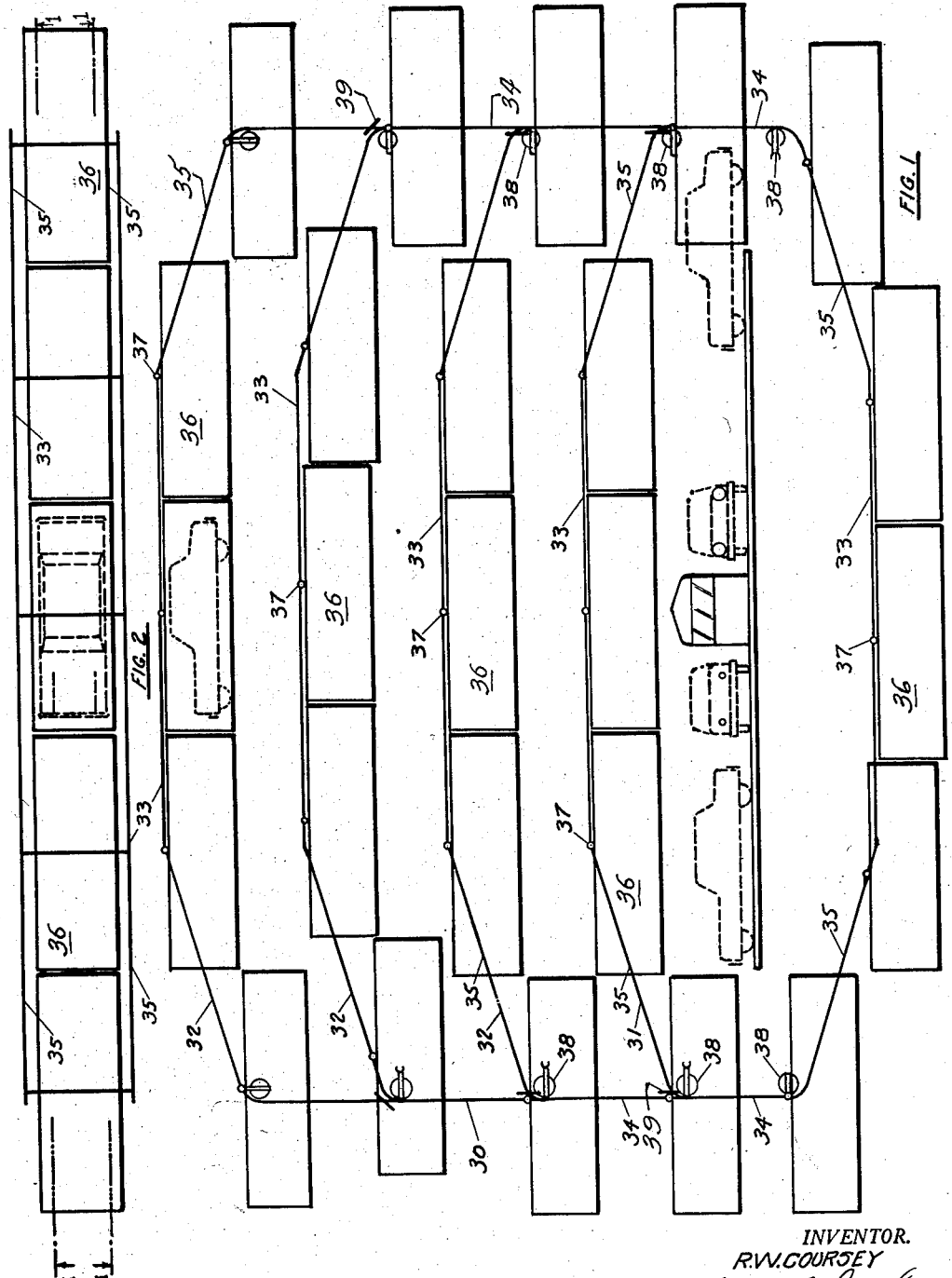
INVENTOR.
R.W. COURSEY
BY *Jerry J. Dunlap*
ATTORNEY

R. W. COURSEY
INVENTOR.

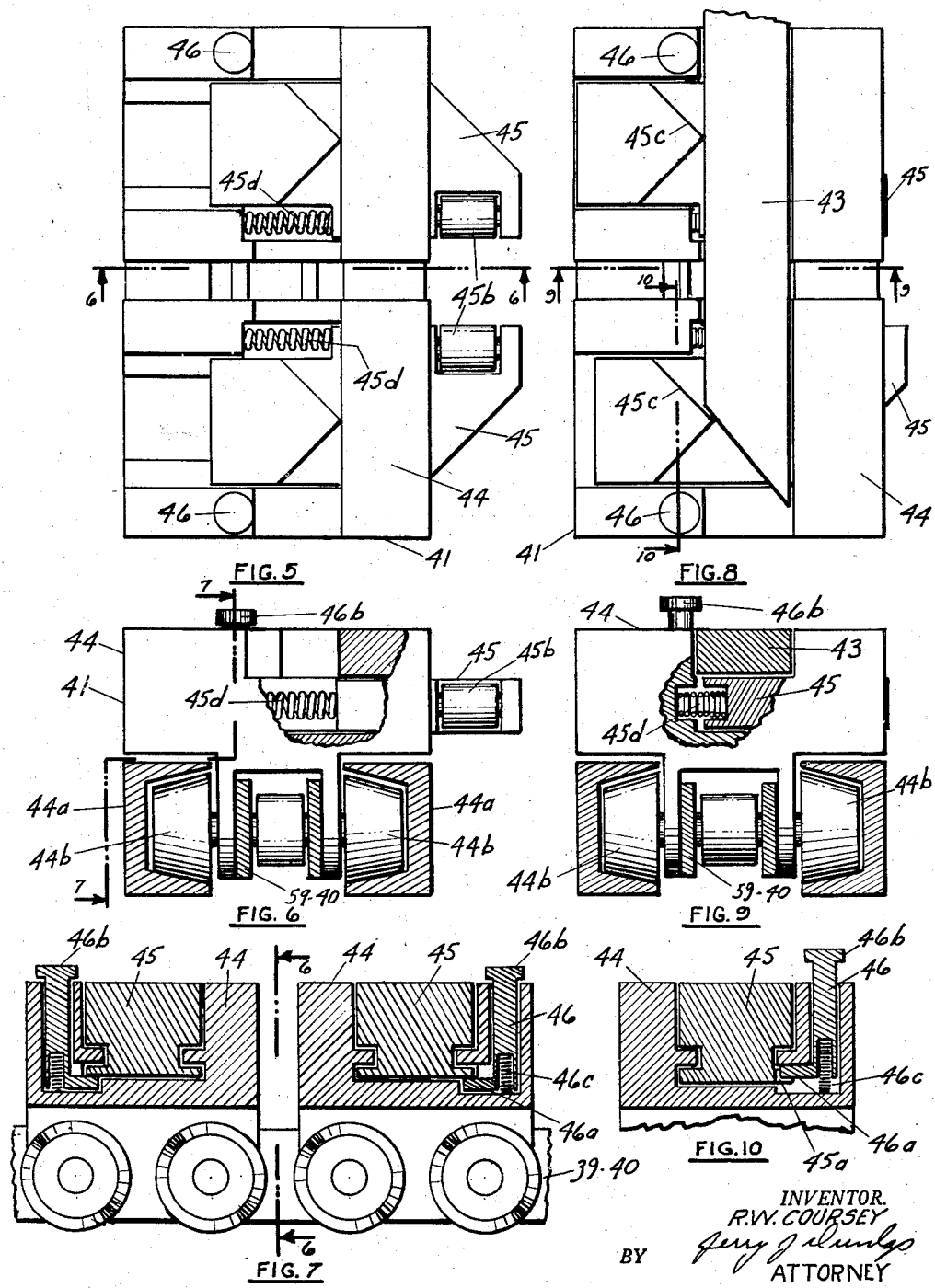

Feb. 24, 1959 R. W. COURSEY 2,874,822
STORAGE SYSTEM
Filed Jan. 31, 1957 11 Sheets-Sheet 4
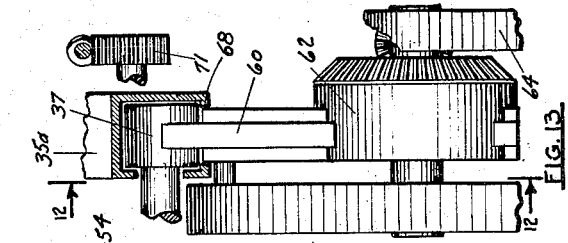
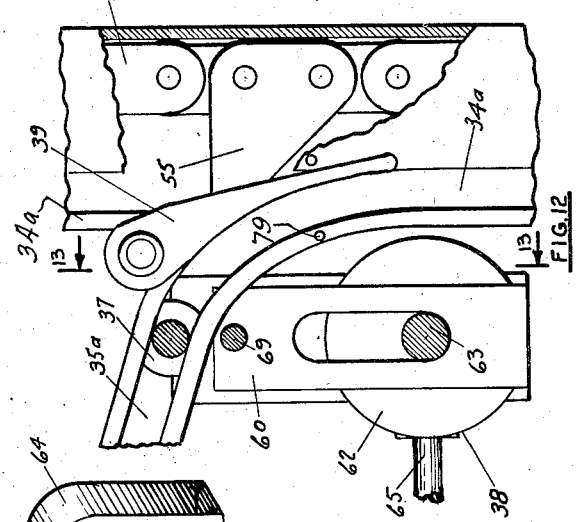
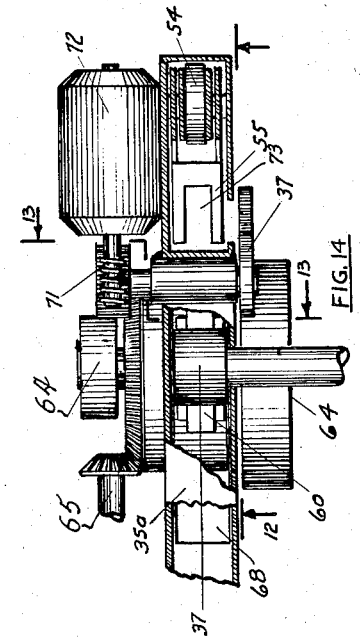
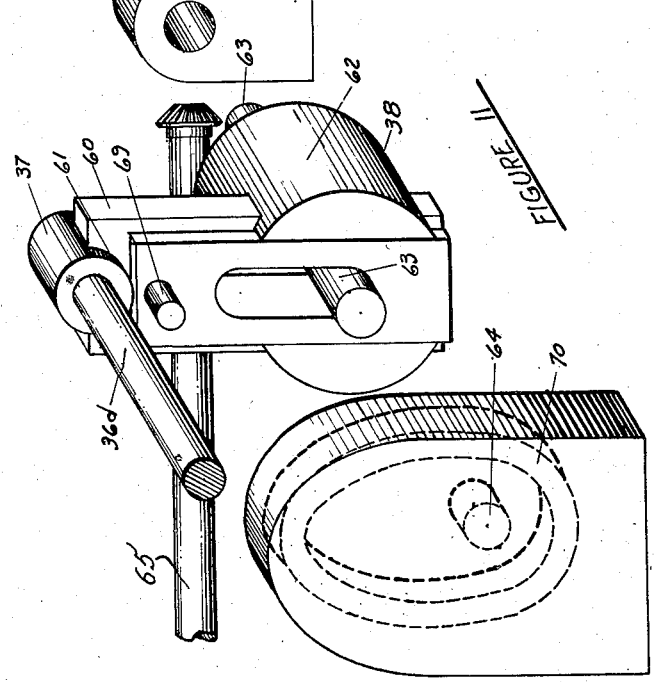

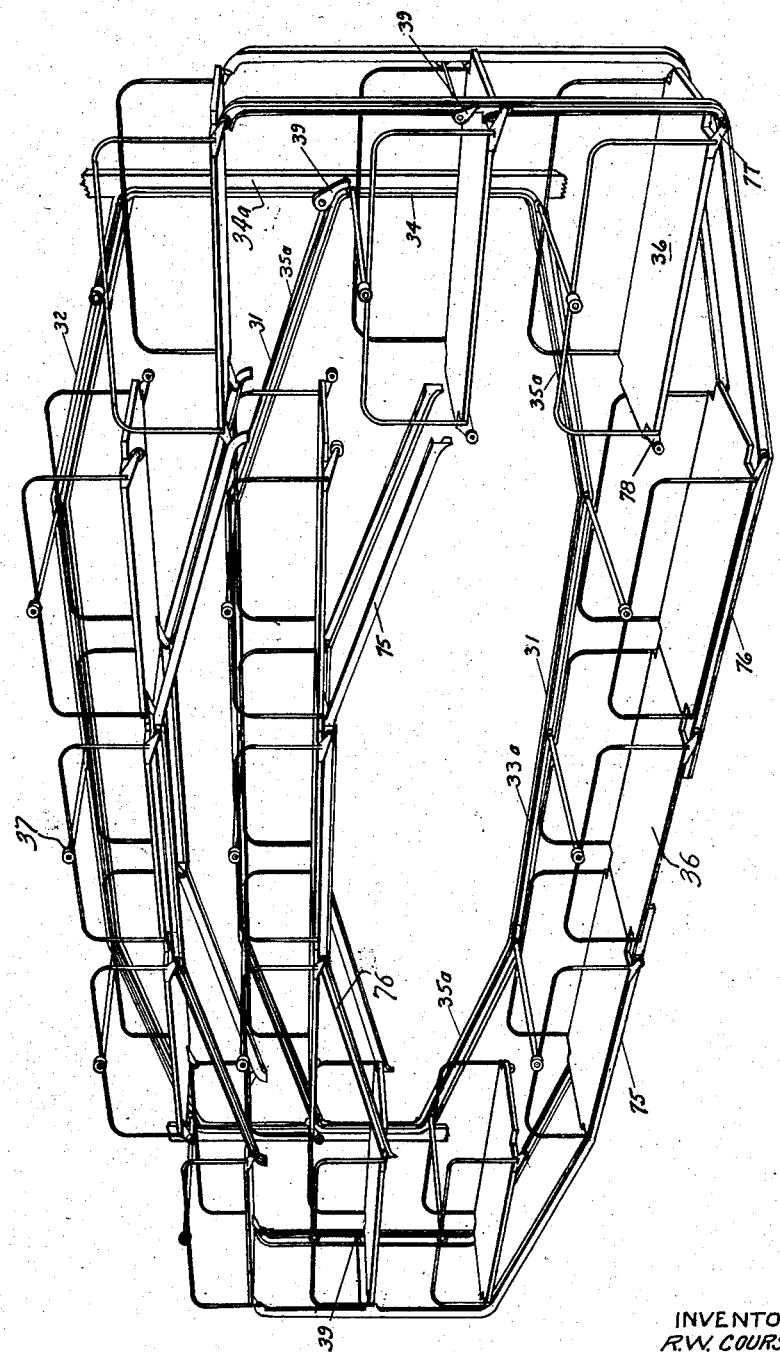

Feb. 24, 1959   R. W. COURSEY   2,874,822
STORAGE SYSTEM
Filed Jan. 31, 1957   11 Sheets-Sheet 7
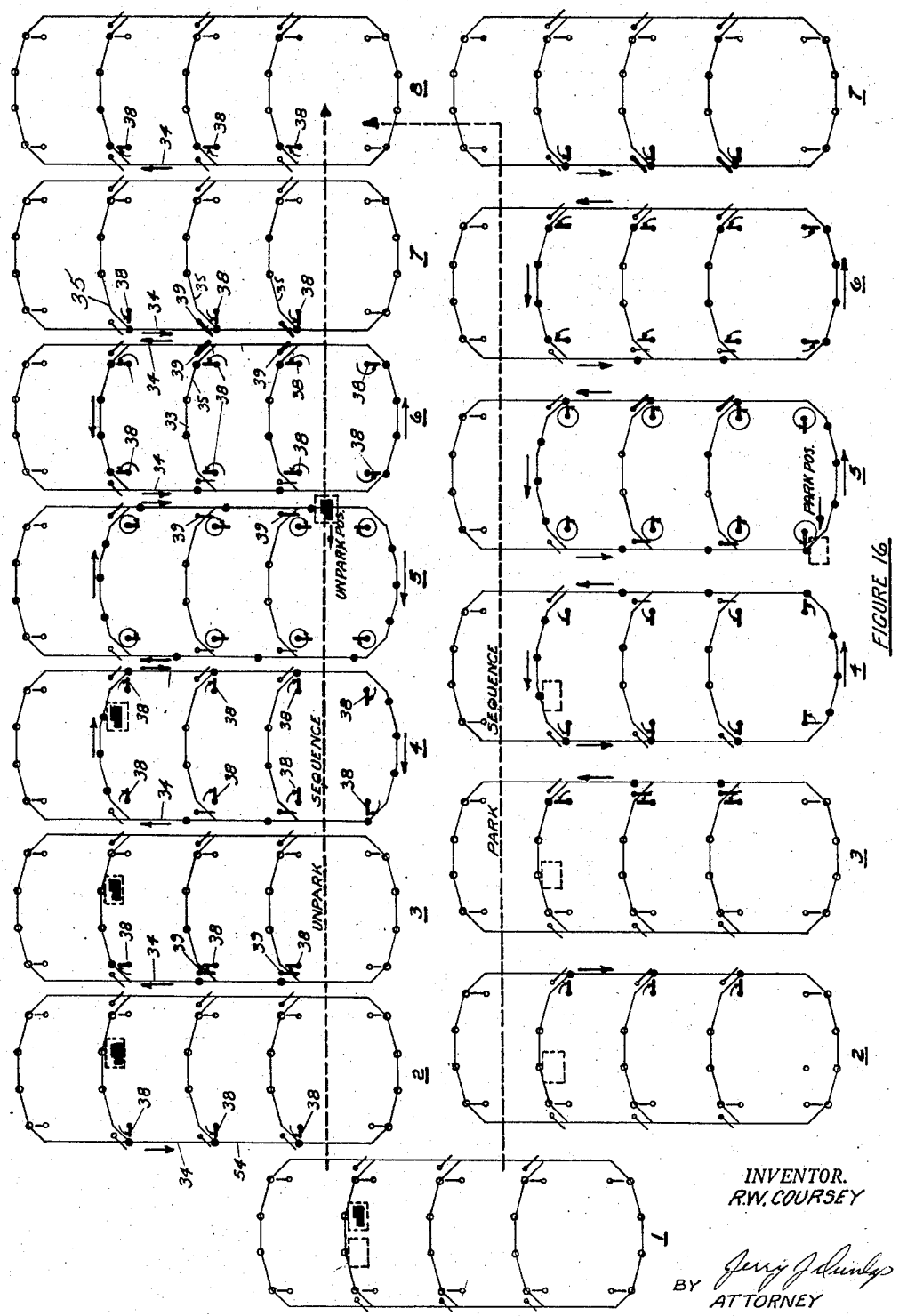
INVENTOR.
R.W. COURSEY
BY
ATTORNEY

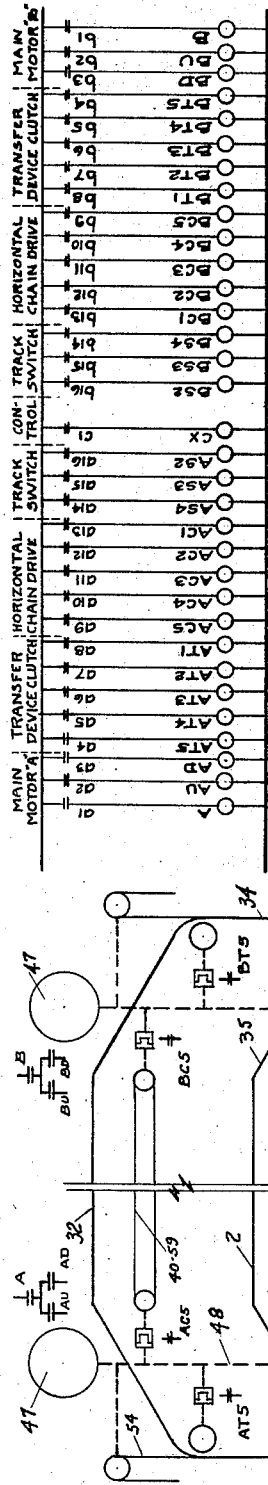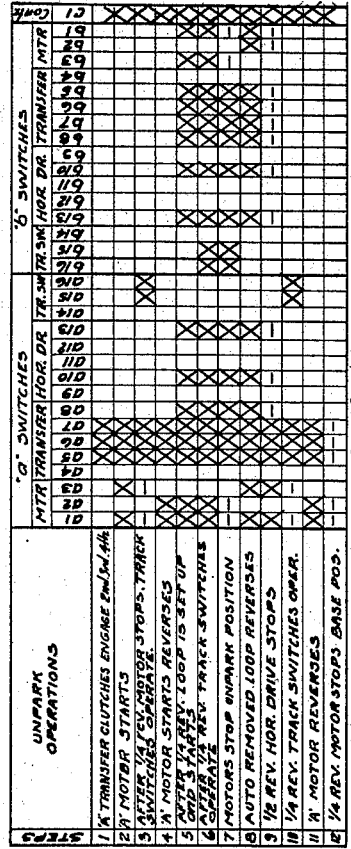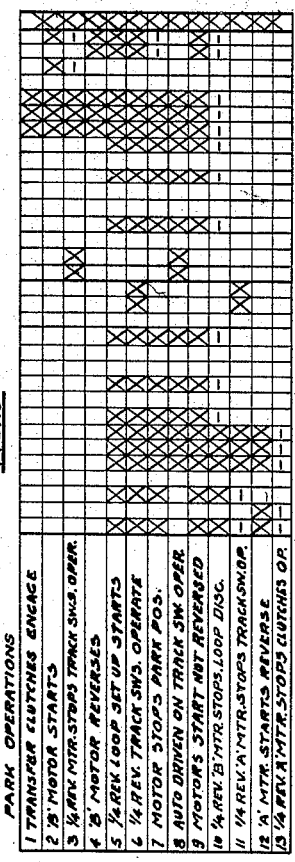
Fig. 17, Fig. 18, Fig. 19, Fig. 20

Feb. 24, 1959 R. W. COURSEY 2,874,822
STORAGE SYSTEM
Filed Jan. 31, 1957 11 Sheets-Sheet 9

INVENTOR
R.W. COURSEY
BY
ATTORNEY

Feb. 24, 1959 — R. W. COURSEY — 2,874,822
STORAGE SYSTEM
Filed Jan. 31, 1957 — 11 Sheets-Sheet 11

INVENTOR
R.W. COURSEY
BY Jerry J. Dunlap
ATTORNEY

United States Patent Office 2,874,822
Patented Feb. 24, 1959

2,874,822

STORAGE SYSTEM

Ralph W. Coursey, Oklahoma City, Okla.

Application January 31, 1957, Serial No. 637,571

5 Claims. (Cl. 198—85)

This invention relates generally to improvements in storage systems, and more particularly, but not by way of limitation, to an improved automobile storage system.

In the present day multi-story automobile storage systems, either the automobiles are raised by means of elevators and then moved laterally to the desired storage positions, or a group of automobiles are moved in carriages in a generally circular loop by means of a continuous chain extending all the way around the loop. The elevator type of system is unduly complicated and ordinarily requires the use of a separate system for moving the automobiles laterally when the automobiles have been raised to the desired floor level. Also, in an elevator type of system, a large portion of the space is taken up by the elevators and large spaces are normally left on each floor level to move the automobiles around. In addition, it is difficult to selectively unpark the automobiles.

In a continuous moving loop type of system operated by a continuous drive chain extending around the loop, the automobiles are moved at the same rate of speed in both the vertical and horizontal directions, as well as at the corners of the loop. It will thus be apparent that the spacing between the automobile supporting carriages must be substantial to prevent the carriages from contacting one another when the direction of movement is changed. And, of course, the spacing between the automobile carriages is wasted space and cannot be utilized in any manner.

The present invention contemplates a storage system particularly suited for the storage of automobiles and readily adapted to multi-story operation and construction. In my system, automobiles are stored in carriages and moved in loop-like patterns in such a manner that the maximum number of automobiles may be stored in a loop. The basic loop of the present construction may extend a height of three floor levels (from the basement to the second floor level of a building), with cars being conveniently parked in one end of the loop and unparked from the opposite end of the loop at ground level. Additional partial loops may be connected with the basic loop, and supported above the basic loop, in such a manner that automobiles may be moved either around the basic loop pattern or around the lower portion of the basic loop and a partial loop above the basic loop without disturbing automobiles stored in any other portion of the system. Any number of partial loops may be provided in stacked relation above the basic loop and any desired number of the storage systems may be placed in side-by-side relation to fit any available configuration of building or parking space. The automobiles are preferably moved around the basic loop or the partial loops and the lower portion of the basic loop by mechanical means, and the control of automobile movement may be readily adapted to automation.

An important object of this invention is to provide apparatus which is constructed and arranged to receive automobiles successively and to discharge them selectively as the owners may require them.

Other objects are to provide and operate such apparatus:

(a) In a minimum cubicle space,
(b) With a minimum number of employes,
(c) Wherein the apparatus may be operated by remote electrical control,
(d) Wherein the automobiles may be parked or unparked in a minimum time,
(e) Without employes driving the customers' automobiles,
(f) Wherein the apparatus is adaptable to various sized rectangular areas and to various numbers of floor levels,
(g) Wherein the apparatus is adaptable to complete automation,
(h) With a maximum convenience to customers,
(i) Wherein the apparatus can be expanded in area or height economically as workload grows,
(j) Wherein the apparatus can be manufactured, shipped and assembled in prefabricated units, and
(k) Which apparatus can be installed as a revenue producing enterprise, or as a part of or associated with any building for use of its customers or employes.

A further object of this invention is to provide an automobile storage system which may be economically manufactured.

Other objects and advantages of the invention will be evident from the following detailed description, when read in conjunction with the accompanying drawings which illustrate my invention.

In the drawings:

Figure 1 is a diagrammatic elevational view of my novel storage system showing the use of five floor levels.

Figure 2 is a plan view of the apparatus shown in Fig. 1.

Figure 5 is a plan view of a typical latching device utilized on the driving chains of my system for engaging the automobile supporting carriages and moving the carriages in the loops.

Figure 6 is a sectional view taken along lines 6—6 of Fig. 5.

Figure 7 is a sectional view taken along lines 7—7 of Fig. 6.

Figure 8 is another plan view of a typical latching device illustrating retraction of the latching device.

Figure 9 is a sectional view taken along lines 9—9 of Fig. 8.

Figure 10 is a sectional view taken along lines 10—10 of Fig. 8.

Figure 11 is an exploded perspective view of a transfer device which is used to move the automobile supporting carriages through certain portions of the loop.

Figure 12 is a side elevational view of a transfer device and associated apparatus.

Figure 13 is a sectional view taken along lines 13—13 of Fig. 12.

Figure 14 is a plan view of a transfer device and associated apparatus, with portions of the apparatus being shown in section to illustrate details of construction.

Figure 16 is a sequence chart showing the steps involved in parking and unparking an automobile on the fourth floor level of a five floor storage system.

Figure 16A is a perspective view of a three floor level structure illustrating the use of stabilizing tracks for the automobile supporting carriages, with the front portion of the loop structure removed to illustrate the stabilizing structure.

Figure 17 is a diagrammatic view of a five level storage system showing the location of the electrical contacts associated with the various operating devices.

Figure 18 is a schematic wiring diagram of the electrical coils to the contacts of Fig. 17 in series with the control contacts of cam devices.

Figure 19 is a sequence chart of an electrical cam for the sequence control of the relays of Fig. 18 for unparking an automobile from a fourth floor level.

Figure 20 is a sequence chart of an electrical cam for the sequence control of the relays of Fig. 18 for bringing an empty automobile supporting carriage to a parking position.

Figures 3, 4:
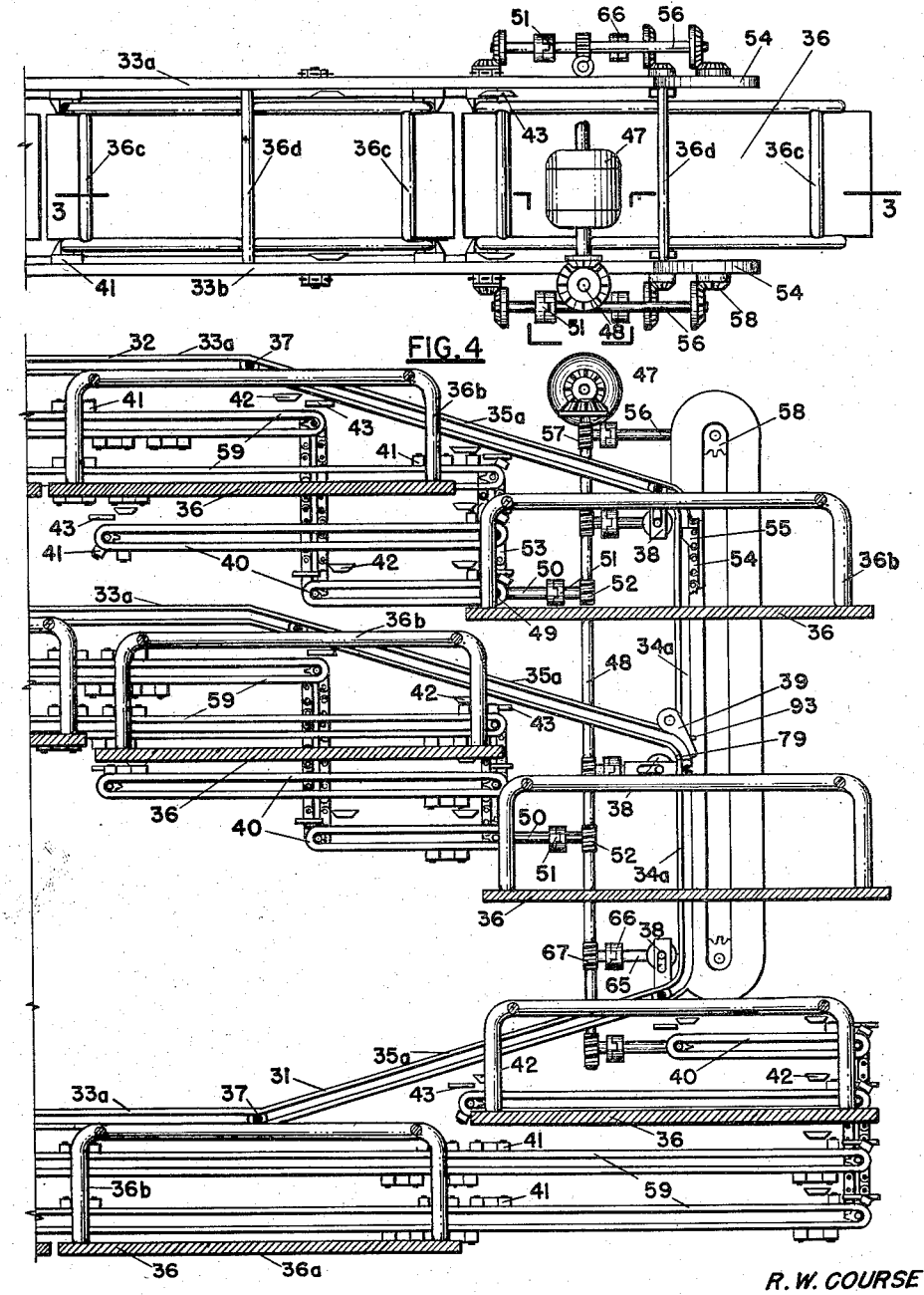
Figure 3 is a vertical sectional view taken lengthwise through a typical three floor level storage system according to my invention, illustrating the structure at one end of the system, with portions of the structure removed for clarity of illustration.
Figure 4 is a plan view of the end of the system shown in Fig. 3.

Referring to the drawings in detail, and particularly Figs. 1 and 2, reference character 30 generally designates an automobile storage system comprising a basic loop portion 31, and three superimposed partial loop portions 32. The system may also be considered as a series of eccentric loops having the lower portion of the basic loop 31 as a common side. The basic loop 31 comprises a pair of vertically spaced horizontally extending track sections 33 and a pair of vertical track sections 34 at the opposite ends of the horizontal track sections 33, with the vertical sections 34 being of a length less than the spacing between the horizontal track sections 33. Each end of each horizontal track section 33 is interconnected to the respective end of a vertical track section 34 by an inclined track section 35. Each of the track sections 33, 34, and 35 is constructed as a pair of opposed rails, as illustrated in the plan view Fig. 2, and as will be more fully hereinafter set forth. Any suitable framework (not shown) may be used to brace and support the various track sections in the positions shown.

A plurality of automobile supporting carriages or cradles 36 are slidingly secured to the track sections of the basic loop 31 by means of rollers 37. It will be observed that the carriages 36 are supported in end-to-end relation on the horizontal track sections 33 and are substantially in contact with one another. The carriages 36 are moved around the basic loop 31 in succession by a chain drive system at different speeds in the horizontal and vertical directions, as will be hereinafter described. The carriages are changed from the vertical track sections 34 to the inclined track sections 35, and vice versa, by transfer devices generally designated at 38.

Each partial loop 32 is constructed in the same manner as the upper three-quarters of the basic loop 31. That is, each partial loop 32 comprises a horizontally extending track section 33 and vertical track sections 34, with interconnecting inclined track sections 35. The vertical track sections 34 of each partial loop 32 are interconnected with the next lower vertical track section 34, whereby each partial loop 32 forms a loop with the lower portion of the basic loop 31. Transfer devices 38 are provided at the intersection of each vertical track section 34 and inclined track section 35 of each partial loop 32 in the same manner as in the basic loop 31. Also, switches 39 are provided at the intersection of the vertical track sections 34 and inclined track sections 35 at the upper end of the basic loop 31 and at each partial loop 32, except for the top partial loop 32. The switches 39 are utilized to control the movement of the carriages 36 between adjacent vertical track sections 34 and the interconnecting inclined track sections 35, as will be more fully hereinafter set forth. Each partial loop 32 is loaded with automobile supporting carriages 36 in the same manner as in the basic loop 31.

As previously indicated, each of the track sections comprises a pair of rails (see Figs. 3 and 4) which I have designated as 33a and 33b, 34a and 34b, and 35a and 35b. These rails are in the form of channels and are disposed in opposed relation to receive the rollers 37 of the carriages 36. Each carriage 36 (see the lowermost carriage in Fig. 3) comprises a platform 36a for receiving an automobile, and a pair of inverted U-shaped supporting arms 36b. The arms 36b are interconnected by cross braces 36c, as shown in the plan view Fig. 4, and the rollers 37 are secured on the opposite ends of a transversely extending shaft 36d, which shaft is secured to the top central portion of the arms 36b.

Two sets of horizontally extending endless chain drives 59 are associated with each horizontal track section 33, and two sets of horizontally extending endless chain drives 40 are associated with each track section 35. Each of the chain drives 59 and 40 has a plurality of latching devices 41 thereon to engage the arms 36b of the carriages 36, and pull the carriages in horizontal directions, depending upon the direction of rotation of the chain drives. Each latching device 41 is actuated in the proper sequence by tripping devices 42 and 43 which are secured to the stationary framework of the storage system.

Referring now to Figs. 5 through 10, and first to Fig. 5, it will be observed that each latching device 41 comprises a body 44 having two horizontally spaced fingers 45 slidingly secured therein. The fingers 45 extend into complementary grooves in the body 44 to move in and out of the body 44, and are constantly urged to their outer positions as shown in Fig. 5 by coiled compression springs 45d. The springs 45d are, of course, anchored to the body 44. As shown in Figs. 7 and 10, a vertically disposed ratchet 46 extends downwardly into a complementary bore in the body 44 adjacent each of the fingers 45. Each ratchet 46 has a lug 46a on the lower end thereof normally disposed below the respective finger 45. A small compression spring 46c is anchored to the body 44 and the lower end portion of each ratchet 46 to constantly urge the ratchet 46 in an upward direction. Also, each finger 45 has a slot 45a (Fig. 10) in the lower edge thereof adjacent the ratchet 46 to receive the lug 46a of the respective ratchet when the fingers 45 have been retracted into the body 44 as illustrated in Figs. 9 and 10. Each ratchet 46 preferably as an enlarged head 46b for purposes which will be hereinafter set forth.

Each body 44 is secured to a link of the chain drives 59 or 40 as shown in Figs. 6 and 9 in such a position that the fingers 45 extend toward the arms 36b of a carriage 36 supported in an adjacent portion of the tracks 33 or 35. The arms 36b of the carriages 36 are received in the space between the fingers 45 of the respective latching device 41, and the suitable rollers 45b are secured in the inner adjacent faces of the fingers 45 to permit vertical movement of the carriage arms 36b between the fingers. Also, the latches 41 and drives 59 and 40 are held in the proper horizontal positions by guides 44a (Figs. 6 and 9) extended along the drives and receiving rollers 44b carried by the devices 41.

The operation of the drive chains 59 and 40 are timed to provide engagement of the latching devices 41 with the arms 36b of the carriages 36 when the carriages are moved into position adjacent the driving chains. For example, take the upper driving chain 59 shown in Fig. 3. The latching device 41 shown at the central portion of this driving chain 59 is engaged with the arm 36b of the respective carriage 36 to move the carriage 36 to the right and roll the rollers 37 in the track sections 33 and 35. As the rollers 37 move down the inclined track section 35, the arm 36b rolls downwardly between the fingers 45 of the latching device 41. When the top portion of the arm 36b is adjacent the top of the latching device 41, the latching device 41 moves over the tripping bar 43 in the manner illustrated in Fig. 8. The bar 43 engages upwardly projecting shoulders 45c of the fingers 45, whereby the fingers 45 are retracted into the body 44 in the manner illustrated in Fig. 8 to release the fingers 45 from the arm 36b. The fingers 45 are then held retracted by the ratchets 46 as shown in Fig. 10. Prior to this releasing action, the left-hand latching device 41 of the upper chain drive 40 (Fig. 3) is moved into position to engage the trailing end of the arm 36b to propel the carriage 36 on down the inclined track section 35.

The latching devices 41 are tripped to release the fingers 45 at the time a latching device 41 moves into a position to engage one of the arms 36b. This releasing operation is accomplished by the tripping bars 42 which are arranged to engage the heads 46b of the ratchets 46 and press the ratchets 46 downwardly to release the lugs 46a from the slots 45a in the fingers 45 as illustrated in Fig. 7. It will be observed that a tripping bar 42 is disposed just inwardly of each tripping bar 43 to release the latching devices 41 at the proper times.

The various chain drives 59 and 40 (Fig. 3) are driven at the same speeds by a drive system comprising a motor 47 and vertical shaft 48 connected to sprockets 49 through stub shafts 50, clutches 51 and gears 52. The sprockets 49 are connected to vertical chains 53 which in turn rotate the respective drive sprockets for the chain drives 59 and 40. The clutches 51 permit driving the chain drives 59 and 40 associated with any particular partial loop 32 or the basic loop 31, as will be more fully hereinafter set forth. It will thus be seen that the carriages 36 are moved horizontally along the track sections 33 and 35 at the same horizontal speeds to retain the horizontal spacing between the carriages, although the actual forward speed of the carriages along the inclined track sections will be greater than along the horizontal track sections 33.

The carriages 36 are moved along the vertical track sections 34 by means of vertically extending endless chain drives 54. Each chain drive 54 has a plurality of supporting steps or latches 55 secured thereon to receive the rollers 37 of the carriages 36 and raise or lower the carriages along the vertical track section 34, depending upon the direction of rotation of the vertical chain drives 54. It will also be observed that the vertical chain drive 54 is driven from the vertical drive shaft 48 through stub shafts 56 and gearing 57, which stub shaft and gearing drive the chain drive sprockets 58. The speed of movement of the vertical chain drives 54 is correlated with the speed of movement of the chain drives 59 and 40 to provide a timed movement of the carriages 36, as will be more fully hereinafter set forth. It will also be noted that the vertical chain drives 54 operate continuously during operation of any of the horizontal chain drives 59 and 40, since the vertical chain drives 54 are connected to the motor 47 at all times and are operated when any portion of the system is placed in operation.

*Transfer device*

The transfer device 38 is shown in detail in Figs. 11 through 14 and comprises an arm 60 having a semicircular shaped recess 61 in the outer end thereof, and the arm 60 is slidingly supported in a complementary shaped slot of a cam 62. The cam 62 is provided with shafts 63 at each end thereof which extend into supporting bearings 64. One end of cam 62 is connected by gears to a stub shaft 65 for rotating the cam and the arm 60. The stub shaft 65 is connected to a clutch 66, as shown in Fig. 3, with the clutch 66 being in turn connected to the main vertical drive shaft 48 through gears 67. It will thus be apparent that the main drive motor 47 operates the transfer devices 38 in timed relation to the operation of the horizontal drives 59 and 40 and the vertical drive 54.

As shown most clearly in Figs. 13 and 14, the outer end of each rail 35a of each track section 35 is provided with a slot 68 extending from a point above the cam 62 to a point in the adjacent vertical rail 34a substantially below the cam 62 to receive the arm 60 during rotation of the cam 62. When the arm 60 is in a substantially vertical position slightly to the left of the position shown in Fig. 12, the roller 37 of one of the carriages 36 moving down the inclined rail 35a comes to rest in the recess 61 in the upper end of the arm 60. The arm 60 then rotates clockwise to move the roller 37 downwardly through the outer end portion of the rail 35a into the next lower vertical rail 34a. However, the outer end portion of each inclined rail 35a is bent on a varying radius to provide a smooth transfer of motion between the main portion of each rail 35a and the adjacent vertical rail 34a in a minimum space, and with a change in speed of the roller 37. Therefore, the arm 60 must change its radius of rotation during rotation of the respective cam 62. For this purpose, I provide a stub shaft 69 on one side of the arm 60 which rides in a cam race 70 formed in the adjacent bearing member 64. The cam race 70 is formed with a radius corresponding to the radius of the end portion of the respective rail 35a, whereby the arm 60 is moved through the cam member 62 during rotation of the transfer device. This varying of the radius of the arm 60 provides a change in the speed of movement of the roller 37 engaged by the arm to gradually reduce the speed of the roller 37 as the roller enters the vertical rail 34a, in exact correspondence to the reduction in speed between the chain drives 59 and 40 and the vertical chain drive 54. When the respective roller 37 is lowered to a position where it will roll out of the recess 61 of the arm 60, a step 55 of the vertical chain drive 54 is in a proper position for receiving the roller and continuing the downward movement of the roller, along with the remainder of the respective carriage 36. It will be noted that step 55 is slotted at 73 (Fig. 14) to receive the end of arm 60 and insure a smooth transfer of the roller 37 from the recess 61 to chain step 55.

The switches 39 are operated in timed relation to the operation of the transfer devices 38, and each switch 39 is driven by means of a suitable motor 72 through a gear arrangement 71 as shown in Fig. 14. From Fig. 12 it will be observed that a roller being raised through the lower rail 34a can move either into the adjacent inclined rail 35a or on upwardly into the next upper vertical rail 34a. The respective switch 39 controls this operation. When the switch 39 is in the position shown in Fig. 12, a roller 37 being raised through the lower rail 34a will be deflected by the switch 39 into the adjacent inclined rail 35a. When the switch 39 is rotated a few degrees clockwise from the position shown in Fig. 12 (up to stop pin 79), a roller 37 being raised through the rail 34a will be guided on upwardly into the next upper vertical rail 34a.

Thus, a carriage 36 may be moved into any of the inclined rails 35a, depending upon the position of the switches 39.

Carriage movement cycle

To facilitate the description of the timing of the movement of the various carriages 36 (see Fig. 15), I have designated a series of the carriage locations by letters A through P, and certain positions for the carriages as positions I through IV. The movement of a carriage 36 from one position to an adjacent position requires a time equivalent to two revolutions of a transfer device 38. For example, it takes the same length of time to move a carriage from position II to position I as it does to move a carriage from position III to position II, that is, two revolutions of one of the transfer devices 38. During this same length of time, a carriage may be moved from location L to location M, the location which has been designated as an unparking location. It will be further observed that a carriage being moved down the inclined track 35 from position II to position I will be displaced downward a vertical distance corresponding to the height of the carriage 36, whereby the carriages supported in the horizontal portions of the basic loop 31 and the partial loops 32 may be retained in virtual end-to-end contact and yet the carriages will not knock against one another when a carriage is being lowered and turned into the vertical portion of the loop or the partial loops.

Figure 15:
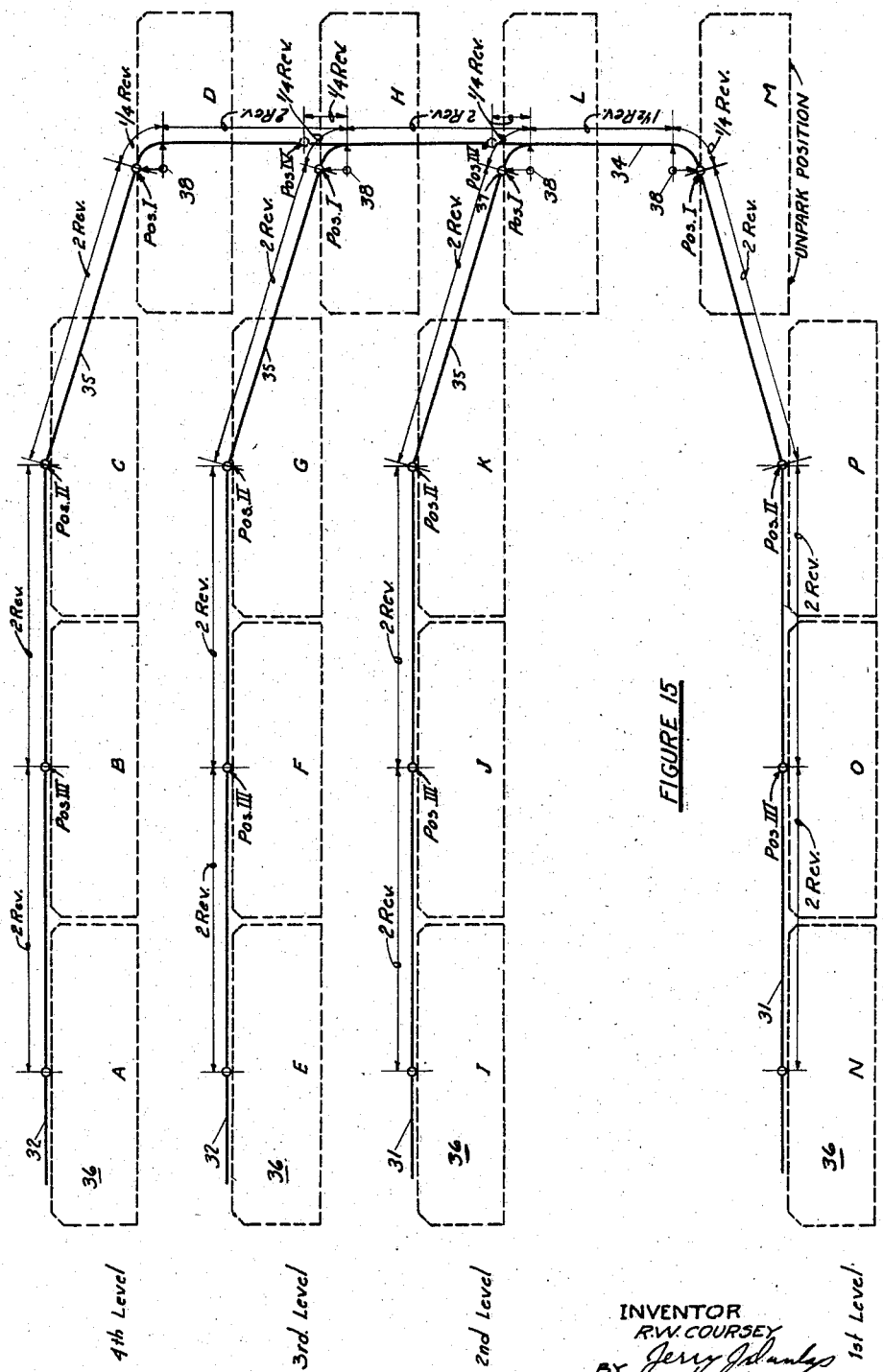
Figure 15 is an elevational diagrammatic view of one end portion of a storage system illustrating the timing involved in moving the automobile supporting carriages.

The positions of the carriages shown in Fig. 15 are the basic positions from which all operating sequences start and return. As an example, let it be assumed that it is desired to unpark an automobile supported in the carriage 36 at location F. Since location M is the unpark location or position, all of the cradles shown at locations E, F, G, H, L, M, P, O, and N must be moved to move the cradle 36 from location F to location M. It will first be observed that the carriage in location L is not in the vertical track section 34, yet must be placed there to provide movement of the carriages in the manner stated. To accomplish this function, the respective transfer device 38 is turned clockwise and simultaneously the drive systems associated with the lower portion of the basic loop 31, the first partial loop 32 (corresponding to the third floor level) and the vertical drive systems are placed in operation to move the carriages E, F, G, H, M, P, O, and N in a clockwise loop pattern. As rollers 37 of the carriage at L enter vertical track 34 after one-quarter revolution of transfer device 38, the carriage becomes part of the moving loop-system and is properly positioned between the carriages at locations H and M. As soon as carriage in location L has been transferred to the vertical track 34, track switch 39 (Figure 3) associated with the carriage at location L is operated clockwise until stopped by pin 79. This allows the carriage at H, and succeeding carriages, to move past this point of tangency. The carriages continue to move in a clockwise loop pattern until the carriage previously in location F is moved to the unparking location M.

The operation of moving a carriage from L into proper position in the loop when the loop is traveling clockwise can be accomplished by simultaneous loop travel and clockwise rotation of transfer device 38 associated with the carriage at L. However, the direction of loop travel is counter clockwise when it is required that an empty carriage, at say F, be moved to the opposite end of the system from location M for purposes of making the carriage available for parking at that location. Since a carriage at L cannot travel upward from the basic position shown, it must be transferred from position I to position IV before the loop movement starts in the counter clockwise direction. To accomplish this, the transfer device 38 associated with the carriage at L is turned clockwise one-quarter revolution, switch 39 (Fig. 3) is moved clockwise against pin 79, vertical drive chain 54 is started moving upward and transfer device 38 returns towards its basic position by moving counter clockwise. When transfer device 38 (minus its carriage roller) has travelled one-quarter revolution, it is in its basic position I, and the carriage roller 37 of the carriage previously at L has travelled upward to position IV. At this instant all driving components of the loop not now in motion commences, and it will be noted all carriages are properly positioned. In other words, each carriage 36 is two transfer device 38 revolutions from the next equivalent position. The loop continues to move counter clockwise until the carriage previously at F is in the park position at the laterally opposite end of the system from location M.

It will be noted that when motion is stopped for parking or unparking, the carriage at L location will be in position IV instead of basic position I. A secondary operation is then necessary to move the carriage from position IV to position I which is the exact reverse of those described for moving it from position I to position IV.

It can be seen that describing the operation of one end of the system for parking and unparking is sufficient in that the opposite end will be operated for unparking identically with that of the described end for parking.

Figure 16 illustrates the sequence of steps required to unpark or park an automobile from or in a position on the fourth floor level of a five level storage system. Step 1 illustrated at the left-hand end of Fig. 16 is the basic position of the carriages from which all operations start. Step 2 in the unpark sequence at the upper portion of the figure requires a one-quarter counter clockwise revolution of the transfer devices 38 associated with the left-hand ends of the second, third and fourth floor levels and downward movement of the adjacent vertical drive 54, to move the associated carriages into the vertical track sections 34. In step 3, the lower two switches 39 are turned, the same transfer devices 38 are turned clockwise one-fourth revolution, and the adjacent vertical drive 54 is moved up to move the carriages associated with the second and third floor levels into the vertical track sections 34. Also, the carriage associated with the transfer device 38 on the left end of the fourth floor level is moved back into its initial position. In step 4, all of the transfer devices 38 are turned clockwise one-quarter revolution to move the carriages associated with the transfer devices 38 at the right-hand side of the second, third and fourth levels, and the transfer device 38 at the left end of the first floor level into the intersection with the vertical track sections 34. The above-mentioned transfer devices 38 are then rotated another one-quarter revolution clockwise as illustrated in Step 5, and the switches 39 on the right-hand side of the second and third floor levels are changed to direct the carriages only along the vertical track section 34. The drive systems associated with the first and fourth floor levels and the interconnecting vertical track sections 34 are then placed in operation to rotate all of the carriages in this portion of the system in a clockwise direction until the desired carriage is located in the unpark position.

The transfer devices 38 associated with all of the floor levels from the first through the fourth floor are then turned counter clockwise one-half a revolution, the vertical drives 54 are operated counter clockwise, and the switches 39 associated with the right-hand ends of the second and third floor levels are simultaneously switched to move the carriages at the right-hand end of the second, third and fourth floor levels back into the inclined track sections 35 as illustrated in Step 6. In Step 7, the transfer devices 38 at the left-hand ends of the second, third and fourth floor levels are turned counter-clockwise one-quarter revolution; the vertical drive in the respective vertical track section 34 is moved downwardly a corresponding distance to move the carriages at the left-hand ends of the second, third and fourth floor levels into the intersection with the inclined track sections 35, and the switches 39 at the left ends of the second and third floor levels are then turned counter clockwise. At the completion of Step 7, the transfer devices 38 associated with the left-hand ends of the second, third and fourth floor levels are turned clockwise one-quarter revolution to move the associated carriages back into the inclined track sections 35 as illustrated in Step 8. The entire system will then again be in the starting position as illustrated in Step 1.

The parking sequence is exactly the reverse of that described above for the unparking sequence to move an empty carriage from the fourth floor level down to the parking position as illustrated in Step 5 at the lower portion of Fig. 16. The system is then returned through Steps 6 and 7 of the parking sequence to the starting position as illustrated in Step 1.

*Stabilizing structure*

To this point, I have described the basic structure of the present system, comprising the basic loop 31 and partial loops 32 for supporting the carriages 36, with means for moving the carriages around the basic loop and through the partial loop. It will be observed, however, that each carriage 36 is suspended by a pair of rollers 37 from the respective track sections, whereby a carriage 36 could be pivoted if loaded unevenly. To stabilize the carriages 36 through their movement around the basic and partial loops, I provide (see Fig. 16A) a series of stabilizing tracks 75 and 76 arranged substantially in the same configuration as the basic and partial loops previously described. Each of the stabilizing track sections 75 and 76 is formed with pairs of channel-shaped rails, with the rails of the section 75 being turned inwardly (that is, with the open sides of the channels facing one another) and the rails of the sections 76 turned outwardly. Also, each carriage 36 is provided with inwardly extending rollers 77 at one end thereof and outwardly extending rollers 78 at the opposite end thereof. The rollers 77 engage the track sections 76, and the rollers 78 engage the track sections 75 during progression of the carriages 36 around the basic and partial loops.

The track sections 75 and 76 are arranged in such a manner that at least one set of the rollers 77 and 78 will engage a stabilizing track section at each position of the carriages 36. Therefore, the carriages 36 will be stabilized either at one or both ends to prevent pivoting of the carriages on their supporting rollers 37. The detailed arrangement of the track sections 75 and 76 is shown in Fig. 16A, and it is not believed necessary to go into explicit detail regarding this arrangement. The specific arrangement of the stabilizing track sections 75 and 76 will be controlled by the pattern of the basic and partial loops 31 and 32, and those skilled in the art will have no difficulty in designing the appropriate stabilizing track sections. It should be noted, however, that switches 39 must be provided at various intersections of the stabilizing track sections in a manner similar to the switches 39 previously described to assure that the rollers 77 and/or 78 will follow the path of movement of the respective supporting rollers 37. The stabilizing tracks 75 and 76 are supported on the same framework utilized for supporting the tracks of the basic loop 31 and partial loops 32.

*Control system*

As previously indicated, my storage system is readily adaptable to a remote control system for moving any selected carriage 36 to a park or unpark position. An example of such a control system is illustrated in Figs. 17 through 29 and described in some detail below. It should be understood, however, that various types of control systems may be used, and the system disclosed herein is for illustration only and not limiting on this invention.

Figure 17 is a schematic view of the operating parts of the system and of the electrical switches or contactors that operate these various parts. For instance, the clutches 51 and 66 may be either motor or solenoid operated by the closing of contacts AC4, AC5, etc. Likewise, the track switches 39 may be solenoid or motor operated by the contacts BS-3, BS-4, etc. It will be noted that contacts for the left-hand group of operators are identified by the letter A and those of the right hand by the letter B. The operating coils for each of these contacts are given the same identifying symbols and are shown in the schematic wiring diagram of Figure 18. These operating coils are energized through the contacts of cam switches. The contacts are shown as $a1$, $a2$, $b1$, $b2$, etc.

For each floor level there will be two cam switches, one for the parking sequence and the other for the unparking sequence. Subsequently, it will be shown how by push-button control one of the motor driven cam switches will start a loop system from base position continue its operation and return it to base position.

Figures 19 and 20 are sequence charts for cam switches for the parking or unparking of a cradle on the fourth floor level. The left hand columns of these charts show the step numbers and briefly describe the steps. The other columns are for indicating (by the letter X) at which sequence step each cam contact closes. The dash (—) indicates a particular cam contact opens. The track switch contacts $a14$, $a15$, $a16$ and $b14$, $b15$, $b16$, are momentary and do not show opening since upon operating, a limit switch resets for operating in the reverse direction at the next momentary contact. Contact $c1$ is an interlocking control, making push-button control inoperative until the sequence cycle is complete.

Figure 22:
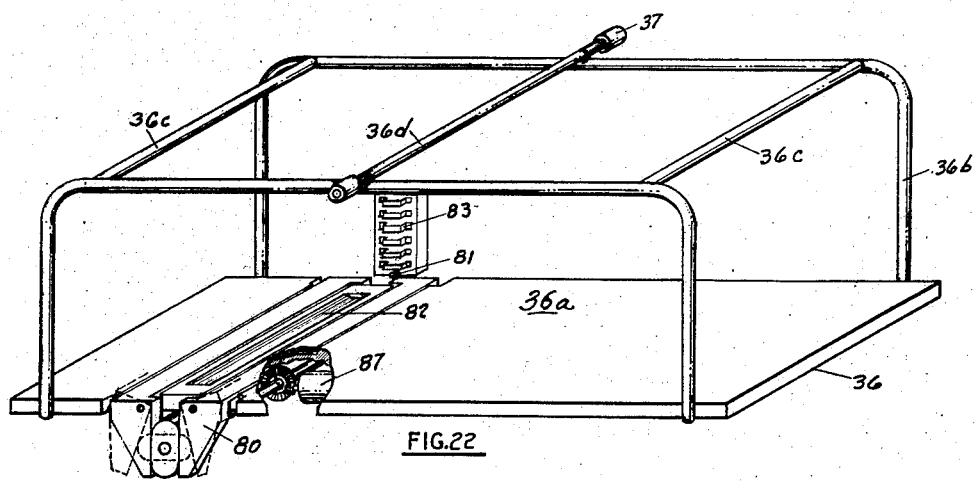
Figure 22 is a partial isometric view of an automobile supporting carriage showing the automobile wheel blocking mechanism and sliding electrical contacts.

Figure 22 is a detailed drawing of one cradle 36. On each cradle is a wheel blocking mechanism 80 operated electrically, a signal system relay 81, and a weight sensitive switch 82. These devices are operable only when the cradle is in certain positions, since contacts are available only at these positions. These positions and the bar contacts are shown in the wiring diagram of Figure 21. At every storage position in the system there is a set of contacts. There is also a set at both the unparking and the parking positions. As can be seen from Figure 21 the circuits available are arranged differently at the three different locations. There are six contacts 83 on each cradle. These can be seen in both Figures 21 and 22.

Figure 23:
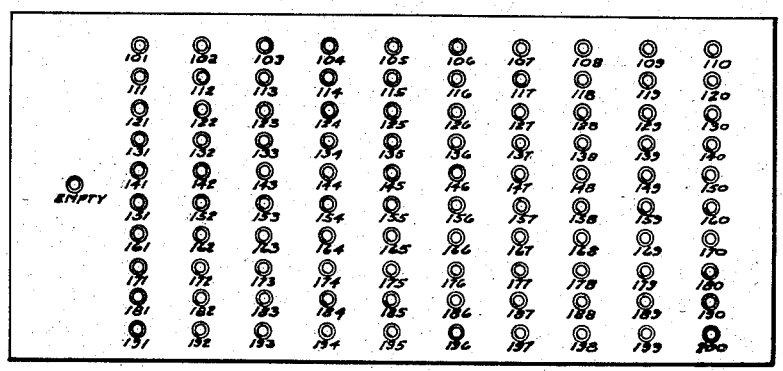
Figure 23 is a push-button station controlling the unparking and parking operations.

Figure 23 shows a possible arrangement of push buttons. Pressing the Empty push button energizes by circuits to be shown later the circuit through the normally closed contacts 84 of the weight sensitive switch 82 on the cradle nearest to the park station. This sets the cam switch into operation to bring that empty cradle to the park position.

To move a cradle with a wanted automobile from the storage position to the unpark position, a push button identified with the number of the cradle containing the automobile is pressed. By circuits to be shown later, the signal sensitive relay 81 of the particular cradle is energized from the storage position contact bars 83. This trips the armature 89 of the relay, closing contacts 90 and 91. Contact 91 being closed allows current to flow through a circuit that sets the cam switch into operation moving the cradle to the unpark position. No current can flow past contacts 90 until the contact bars 92 at the unpark position is reached. At this position current flows through these contacts energizing the time delay relay T whose contacts T close the circuit to the wheel blocking motor 87. This motor turns until the wheels are unblocked at which time the limit switch stops it and prepares for a later reblocking operation. After the unloaded cradle moves on towards the system's base position, the armature 89 of the signal sensitive relay 81 is mechanically reset by a fixed setting bar not shown in the drawings.

Figure 24:
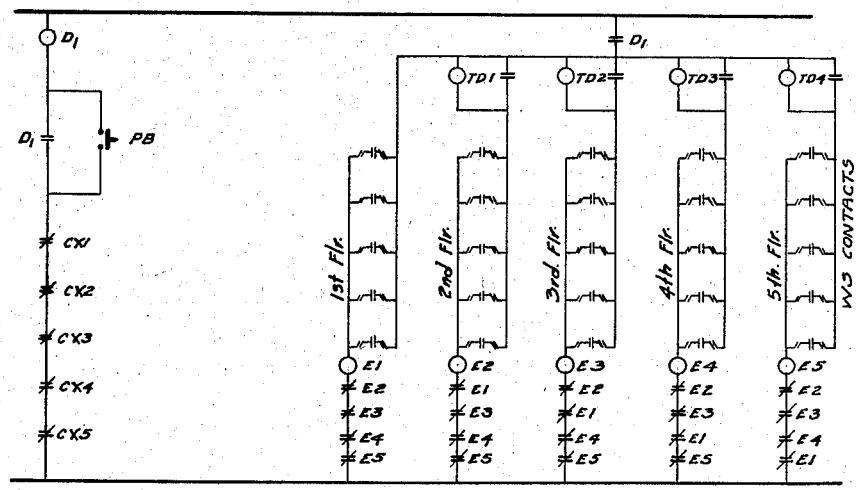
Figure 24 is a schematic diagram of the electrical connections for initiating the operations that will select an empty carriage from the closest floor level and move it to a position for parking an automobile.
Figure 25:
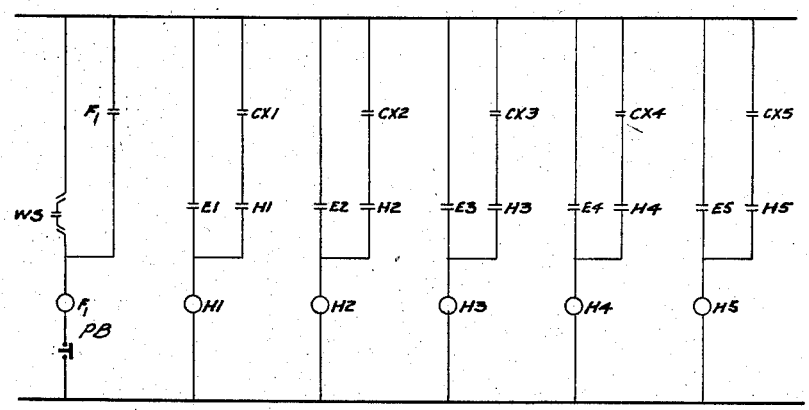
Figure 25 is a schematic diagram of the electrical connections for stopping an empty carriage at the parking position when starting was initiated by the push-button in Fig. 24.
Figure 26:
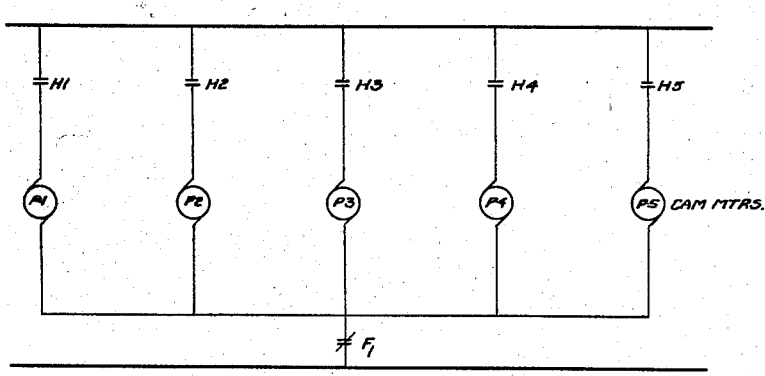
Figure 26 is a schematic diagram of the electrical connections of part of the system.

Figures 24, 25 and 26 are schematic wiring diagrams of the electrical circuits required to initiate and insure complete operation of the system in locating and moving an empty cradle to the parking position and returning the system to its base position after an automobile is driven onto the cradle.

Referring now to Figure 24. The CX contacts shown insure that the push-button circuit is open once any cam switch for any floor level has started its sequence. When the system is in base position, the cam switch of Figure 19 is on Step 1. This chart shows that in this position contact $c1$ is open. From Figure 18 it can be seen that when $c1$ contact is open relay CX is not energized. When the cam switch of Fig. 19 moves toward Step 2 contact $c1$ closes, energizing relay CX of Fig. 18 and opening its CX contact shown in Fig. 24. In Fig. 24, CX contacts for cam switches of all floor levels are shown in series with the push button, thus, if any cam in the system is in operation, the push button is inoperable.

Now to operate the park sequence, push button PB is pressed, energizing relay coil $D_1$ closing contacts $D_1$ and sealing in the circuit. Another $D_1$ contact supplies energy consecutively to control circuits at each floor because of the time delay relays TD. The time delay relays have progressively longer delay settings the higher the floor level. This allows the selection of the empty cradle closest to the park position. The weight sensitive relays WS shown are those on the cradles. Suppose, for instance, that there are no empty cradles on the first floor but there is one or more on the second floor. The WS relays on the first floor, all cradles being loaded, would have their contacts open. When the TD1 relay on the second floor, after a short delay, closed its contact, the WS relay contacts of an empty cradle would be closed allowing current to flow through relay coil E2 and the normally closed contacts E1, E3, E4 and E5. With coil E2 energized all other floor circuits are opened through the now open but normally closed E2 contacts insuring that they are inoperable as their TD relays progressively operate.

The coil E2 in Figure 24 being energized closes its contact E2 in Figure 25. This energizes coil H2 whose contacts H2 in Fig. 26 start the cam switch on its sequence. As soon as the cam switch has moved, it closes the contact C1 in Fig. 19 energizing relay CX in Fig. 18 and sealing in the H2 relay with its CX2 contact in Fig. 25. The cam switch motor is now sealed in by the CX2 contacts in Fig. 25. The time delay relay TD1 in Fig. 24 runs its course and opens its contacts. The push button circuit has also been opened by the starting of the cam switch motor and opening of normally closed contact CX2 of Figure 24.

The operations are initiated by the cam switch to move the loop counter clockwise until the first empty cradle, with its weight sensitive switch contact 84 (Fig. 21) closed, arrives at the parking position. In this position shown as WS in Fig. 25, relay coil $F_1$ is energized sealing itself in through its contact $F_1$ in Fig. 25 and stopping the cam motor by opening the normally closed contact $F_1$ in Fig. 26.

A car is then driven on the cradle which opens the WS contact of Fig. 25, but since relay $F_1$ has sealed itself in, cam movement must be started again by breaking the sealed in circuit by some such device as the push button PB of Fig. 25. This can be various types of devices such as a switch operated when the customer removes a ticket with time stamped on it from a clock device (not shown) after parking the car and getting in the clear.

Since the control circuit with the H2 coil in Fig. 25 has remained sealed by contact H2, opening of the circuit with the $F_1$ relay allows the normally closed contact $F_1$ in Figure 26 to again close causing the cam switch to finish out its cycle and return to base position where cam switch $c1$ (Fig. 19) de-energizes relay CX (Fig. 18), opening contact CX2 (Fig. 25) and breaking the sealed circuit controlling the cam switch motor.

Figure 21:
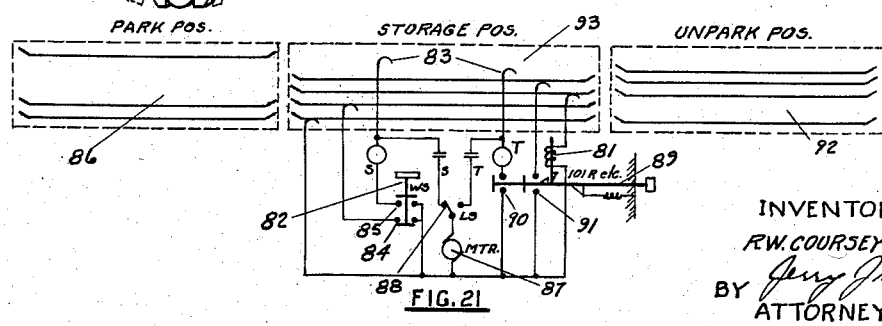
Figure 21 is a wiring diagram for electrical equipment on each automobile supporting carriage.

To locate and move to the unpark position a cradle having a customer's car who wishes to have it unparked, a push button identified with the particular cradle is pressed. This push button transmits a voltage sensitive, frequency sensitive, impulse or other type of signal to every cradle in the system. The cradle with the signal receiver relay tuned to that particular signal trips its armature 89 (Fig. 21). This closes contact 91 in Fig. 21.

Figure 27:
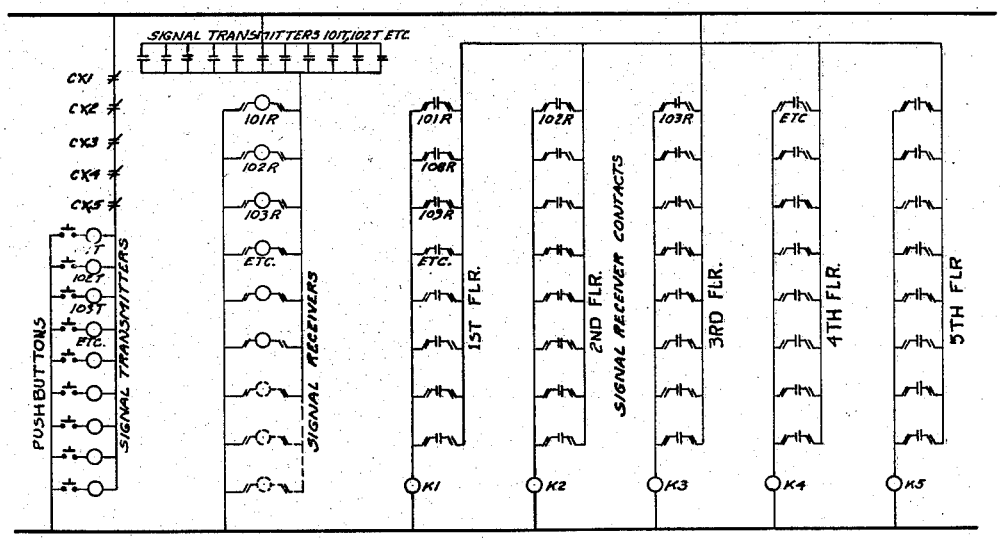
Figure 27 is a schematic diagram of the electrical connections for initiating the operations that will select a carriage occupied by a wanted automobile and move it to a position for unparking the automobile.

To take a case in point and referring to Fig. 27, push button at signal transmitter 103T is pressed. If the system is in base position the normally closed contacts CX are all closed and the 103T signal transmitter relay operates its transmitter 103T and the signal receiver coil 103R trips the armature closing its contacts 103R shown on the third floor level. Closing of these contacts energizes relay K3 whose contacts K3 in Fig. 28 operate relay L3 which starts cam switch motor UP3 in Fig. 29. Just before the cradle 103 has cleared its bar contacts 98 (Fig. 21), the cam switch has moved far enough to operate control switch $c1$ (Fig. 20), energizing relay CX (Fig. 18), opening normally closed contacts CX3 (Fig. 27), and making all push buttons inoperable. Normally open contact CX3 in Fig. 28 are closed also sealing in the relay L3 and cam switch motor UP3 (Fig. 29).

Figure 28:
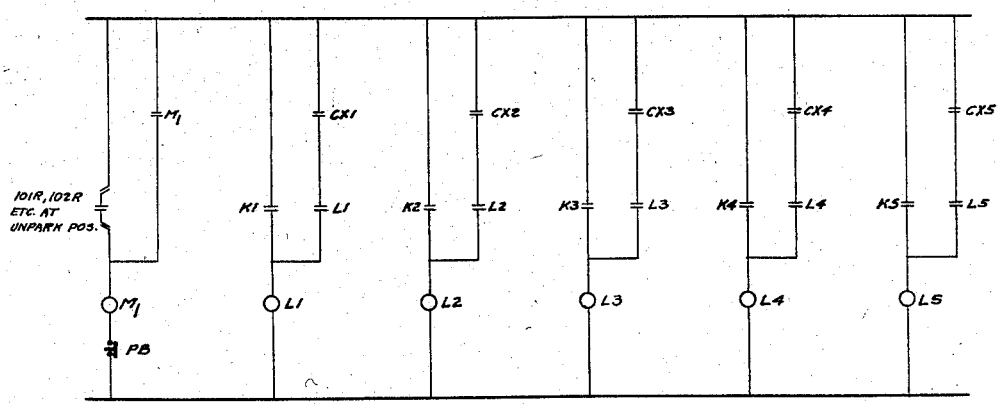
Figure 28 is a schematic diagram of the electrical connections for stopping a carriage occupied by the wanted automobile at the unparking position.

The system continues to move clockwise in the loop until the cradle with the tripped armature of its signal receiver relay and contacts 91 closed (Fig. 21) arrives at the unpark position, Fig. 28. This operates relay $M_1$ sealing itself in through its contact $M_1$ and opening the normally closed contacts $M_1$ in Fig. 29. This stops the cam switch motor but keeps the control circuit with L3 relay sealed in Fig. 28.

Figure 29:
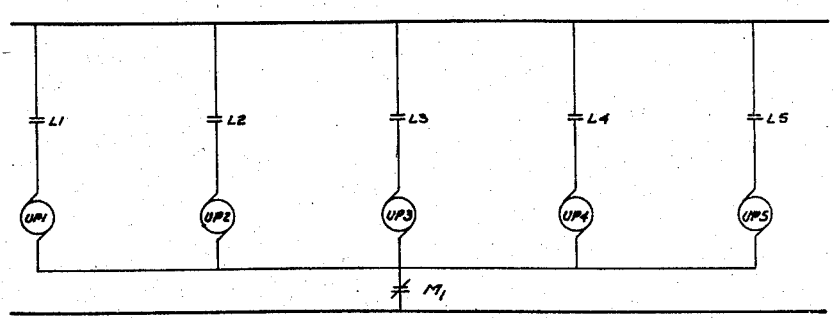
Figure 29 is a schematic diagram of the electrical connections for switching the proper sequence operating cams for moving the carriage occupied by the wanted automobile to the unparking position.

When the customer drives his automobile out of the cradle, push button PB (Fig. 28) is tripped by the customer, photoelectric cell, or weight switch which de-energizes relay coil $M_1$, opening the seal contacts $M_1$, and allowing the normally closed contacts $M_1$ in Fig. 29 to close. The cam motor resumes its cycle until in the base position, whereupon control switch CX3 opens the control circuit of Fig. 28 and closes the push button circuits of Fig. 27, making the push button again operable.

From the foregoing it will be noted that the apparatus is adapted to readily and easily receive, store and discharge a large number of vehicles and that it occupies a minimum space. It is apparent that the number of floor levels is not limited, nor is the length of the system. It is also apparent that any number of such systems may be installed and operated side-by-side in an automobile storage building.

The invention may be embodied in other specific forms without departing from the essential characteristics thereof. Hence the present embodiment is therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

I claim:

1. A storage system comprising a pair of vertically-spaced substantially horizontal track sections, a vertically extending track section adjacent each end of said horizontal track sections, said vertical track sections having a length less than the spacing between said horizontal track sections, inclined track sections interconnecting the adjacent end portions of said horizontal and vertical track sections to provide a track in the form of a loop in a vertical plane, a plurality of storage carriages slidingly secured to said loop, means for moving said carriages at different speeds along the horizontal, inclined and vertical track sections to maintain the minimum spacing between adjacent carriages, an arm at the intersection of each inclined and vertical track section arranged to engage the carriages and move the carriages through said intersections, and a cam connected to each arm for varying the speed of the carriage engaging portion of the respective arm as a carriage is being moved through the respective intersection.

2. A system as defined in claim 1 characterized further in that said track sections are in the form of opposed rails, and rollers on each carriage arranged to engage said rails and suspend the carriages from the track sections.

3. A storage system comprising a pair of vertically-spaced substantially horizontal track sections, a vertically extending track section adjacent each end of said horizontal track sections, said vertical track sections having a length less than the spacing between said horizontal track sections, inclined track sections interconnecting the adjacent end portions of said horizontal and vertical track sections to provide a track in the form of a loop in a vertical plane, a plurality of storage carriages slidingly secured to said loop, a separate set of driving chains for each of the horizontal, vertical and inclined track sections of said loop, latches on each set of chains for engaging the carriages and moving the carriages along the respective track sections, means for driving the chains associated with the horizontal and inclined track sections independently from the chains associated with the vertical track sections, a pivotable arm at each intersection of a vertical and inclined track section for transferring the carriages between the chain drives associated with the respective vertical and inclined track sections, and a cam connected to each of said arms for varying the turning radius of each arm as the arm is pivoted to transfer a carriage.

4. A storage system comprising a pair of vertically-spaced substantially horizontal track sections, a vertically extending track section adjacent each end of said horizontal track sections, said vertical track sections having a length less than the spacing between said horizontal track sections, inclined track sections interconnecting the adjacent end portions of said horizontal and vertical track sections to provide a track in the form of a loop in a vertical plane, a plurality of storage carriages slidingly secured to said loop, a separate set of driving chains for each of the horizontal, vertical and inclined track sections of said loop, latches on each set of chains for engaging the carriages and moving the carriages along the respective track sections, means for driving the chains associated with the horizontal and inclined track sections independently from the chains associated with the vertical track sections, each of said track sections comprising opposed rails in the form of channels, a support shaft secured transversely to the top central portion of each carriage, rollers on the opposite ends of each shaft rotatably disposed in the opposed rails of the track sections to slidingly support the carriages on the loop, the inner side of each rail being slotted at the intersection of each inclined and vertical track section, and an arm at each of the last-mentioned intersections extending into said slots for engaging said rollers and transferring the carriages between the chain drives associated with the inclined and vertical track sections.

5. A storage system comprising a pair of vertically-spaced substantially horizontal track sections, a vertically extending track section adjacent each end of said horizontal track sections, said vertical track sections having a length less than the spacing between said horizontal track sections, inclined track sections interconnecting the adjacent end portions of said horizontal and vertical track sections to provide a track in the form of a loop in a vertical plane, a plurality of storage carriages slidingly secured to said loop, a horizontally extending endless chain adjacent each horizontal track section, a horizontally extending endless chain adjacent each inclined track section, a vertically extending endless chain adjacent each vertical track section, latches on each chain for engaging and moving the carriages along the adjacent track section, and a power means for driving the chains and moving the carriages at different speeds in the horizontal, inclined and vertical directions to control the spacing between carriages being moved around the loop.

References Cited in the file of this patent

UNITED STATES PATENTS

| | | |
|---|---|---|
| 1,458,881 | Gromer | June 12, 1923 |
| 1,646,259 | Roberts | Oct. 18, 1927 |
| 1,815,738 | MacDonald | July 21, 1931 |
| 1,837,605 | Baker | Dec. 22, 1931 |
| 2,260,528 | Levy et al. | Oct. 28, 1941 |
| 2,268,862 | Ellis | Jan. 6, 1942 |
| 2,645,367 | Stabile | July 14, 1953 |

FOREIGN PATENTS

| | | |
|---|---|---|
| 464,013 | Great Britain | Apr. 9, 1937 |
| 260,397 | Switzerland | July 16, 1949 |